(12) United States Patent
Sesek et al.

(10) Patent No.: US 7,283,271 B2
(45) Date of Patent: Oct. 16, 2007

(54) METHODS OF MONITORING A MEDIA IMAGING SYSTEM, MEDIA IMAGING MONITORING SYSTEMS, ARTICLES OF MANUFACTURE

(75) Inventors: Robert Sesek, Meridian, ID (US); Travis J. Parry, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1078 days.

(21) Appl. No.: 10/354,632

(22) Filed: Jan. 29, 2003

(65) Prior Publication Data

US 2004/0145774 A1 Jul. 29, 2004

(51) Int. Cl.
G06F 3/12 (2006.01)
G06F 15/00 (2006.01)

(52) U.S. Cl. .................................... 358/1.15; 358/1.13
(58) Field of Classification Search ............... 358/1.15, 358/1.9, 1.13, 1.14, 1.18, 1.6; 709/223, 226, 709/228, 229; 710/7, 8, 19
See application file for complete search history.

(56) References Cited

U.S. PATENT DOCUMENTS

| | | | |
|---|---|---|---|
| 5,956,487 | A | 9/1999 | Venkatraman et al. |
| 6,176,575 | B1 | 1/2001 | Crawford et al. |
| 6,317,848 | B1 | 11/2001 | Sorens et al. |
| 6,449,054 | B1 * | 9/2002 | Cox et al. .................. 358/1.15 |
| 6,941,865 | B2 * | 9/2005 | Kato .......................... 101/484 |

2001/0035972 A1 11/2001 Wurmfeld

OTHER PUBLICATIONS

"Reformatting Dynamically Rerouted Production Requests"; U.S. Appl. No. 10/186,057, filed Jun. 27, 2002, Robert Sesek.
"Image Forming Devices, Imaging Methods, and Methods of Modifying a Configuration of an Image Forming Device"; U.S. Appl. No. 10/260,827, Travis Parry et al.
"Test Software and Study Reports"; Spencer and Associates; www.spencer.com/TestReports.html; Sep. 27, 2002; 2 pps.
"The Color Hardcopy Quality Factors (CHQ) IV Test File Suite"; Spencer and Associates; www.spencer.com/CHQFfiles.html; Sep. 27, 2002; 2 pps.
"The Color Hardcopy Quality Enhancement Test File Suite"; Spencer and Associates; www.spencer.com/HQEfiles.html; Sep. 27, 2002; 1 p.

* cited by examiner

Primary Examiner—Douglas Q. Tran (57) ABSTRACT

Methods of monitoring a media imaging system, media imaging monitoring systems, articles of manufacture, and data signals are described. According to one aspect, a method of monitoring a media imaging system includes providing image data comprising a plurality of image jobs configured to cause a plurality of media imaging devices of the media imaging system to generate a plurality of hard images upon media, wherein the image jobs correspond to respective ones of the media imaging devices, reassigning at least one of the image jobs from one of the media imaging devices to correspond to another of the media imaging devices, and obtaining performance data regarding imaging operations of the media imaging devices with respect to imaging of hard images upon media according to the image data after the reassigning.

29 Claims, 4 Drawing Sheets

METHODS OF MONITORING A MEDIA IMAGING SYSTEM, MEDIA IMAGING MONITORING SYSTEMS, ARTICLES OF MANUFACTURE

FIELD OF THE INVENTION

At least some embodiments of the invention relate to methods of monitoring a media imaging system, media imaging monitoring systems, articles of manufacture, and data signals.

BACKGROUND OF THE INVENTION

Imaging devices, such as laser printers, ink jet printers, etc. are utilized in numerous home and office applications. The increasing sophistication of both imaging devices and personal computers generally has resulted in heightened reliance upon fast and proper operation of the imaging devices in everyday home and work environments. For example, modern host devices provide faster processing and increased storage of data compared with devices of a few years ago, while imaging devices coupled with host devices have experienced significant advancements in color reproduction, resolution and other attributes.

Furthermore, computer networks that include imaging devices have also increased in sophistication, applications, and capabilities. Some computer networks include a production server (e.g., a printer server) configured to manage printing operations for a plurality of hosts of the computer network. In exemplary operations, the printer server can route print jobs to printers, and perform preliminary processing of print jobs. More recently, devices have been introduced to dynamically reroute jobs. For example, a job may initially be intended for printing using a given printer, but for an appropriate reason (e.g., the desired recipient printer is inoperable or off-line), the printer server may route the job to another printer. These more recent arrangements have benefits of providing increased assurance that a job would be imaged.

However, drawbacks may be experienced with rerouting of jobs to printers other than the originally desired destination. For example, a user may not know which printer of the system actually processed the job. In other implementations, it may be desired to reconfigure the devices of the computer network for job load balancing. However, impacts of rerouting are not known until rerouting is implemented which may be time consuming and costly.

At least some embodiments of the invention provide media imaging devices, systems and methods having improvements with respect to imaging operations and management of imaging operations.

DETAILED DESCRIPTION OF THE INVENTION

According to one embodiment, a method of monitoring a media imaging system comprises providing image data comprising a plurality of image jobs configured to cause a plurality of media imaging devices of the media imaging system to generate a plurality of hard images upon media, wherein the image jobs correspond to respective ones of the media imaging devices, reassigning at least one of the image jobs from one of the media imaging devices to correspond to another of the media imaging devices, and obtaining performance data regarding imaging operations of the media imaging devices with respect to imaging of hard images upon media according to the image data after the reassigning.

According to another embodiment, a media imaging monitoring system comprises a communications interface configured to access image data configured to cause a plurality of media imaging devices of a media imaging system having a first configuration to generate a plurality of hard images upon media and processing circuitry configured to access the image data and to simulate imaging operations of a plurality of media imaging devices of the media imaging system having a second configuration different than the first configuration with respect to imaging of hard images upon media according to the image data.

According to an additional embodiment, a media imaging monitoring system comprises means for accessing image data configured to cause a plurality of media imaging devices arranged according to a first configuration of a media imaging system to form a plurality of hard images upon media, means for accessing a second configuration of the media imaging system different than the first configuration and including at least some of the media imaging devices, and means for simulating imaging operations of the at least some media imaging devices of the second configuration of the media imaging system with respect to imaging of hard images upon media according to the image data.

According to another embodiment, an article of manufacture comprises a processor-usable medium comprising processor-usable code configured to cause processing circuitry to access image data configured to cause a plurality of media imaging devices of a media imaging system having a first configuration to generate a plurality of hard images upon media, access a media imaging system having a second configuration different than the first configuration, and obtain performance data regarding imaging operations of the media imaging system having the second configuration with respect to the formation of hard images using the accessed image data.

According to yet another embodiment, a data signal embodied in a transmission medium comprises processor-usable code configured to cause processing circuitry to access image data configured to cause a plurality of media imaging devices of a media imaging system having a first configuration to generate a plurality of hard images upon media, processor-usable code configured to cause processing circuitry to access a media imaging system having a second configuration different than the first configuration, and processor-usable code configured to cause processing circuitry to obtain performance data regarding imaging operations of the media imaging system having the second configuration with respect to the formation of hard images using the accessed image data.

Figure 1:
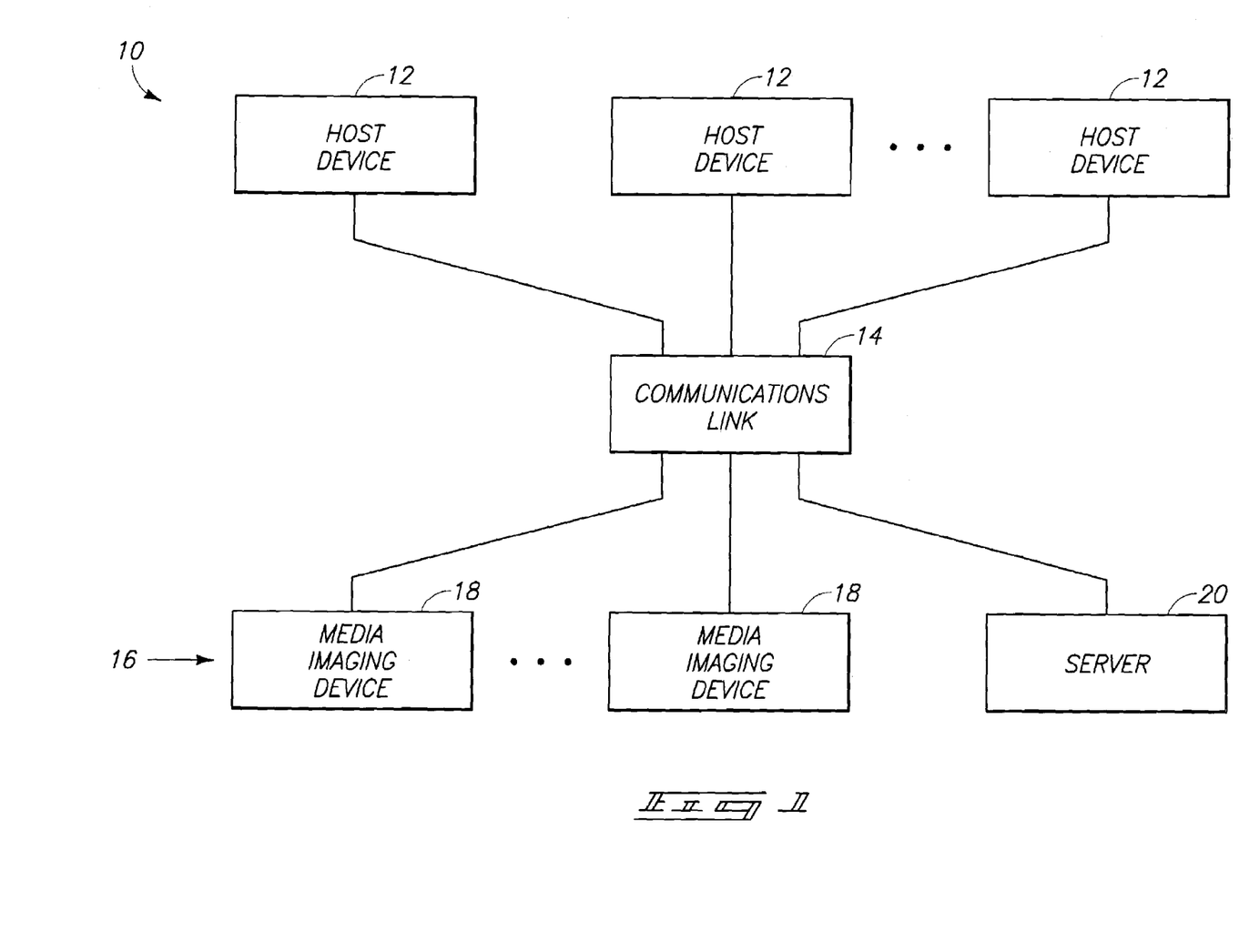
FIG. 1 is an illustrative representation of an exemplary computer network according to one embodiment.

FIG. 1 depicts an exemplary computer network 10 including a plurality of host devices 12, a communications link 14 and a media imaging system 16. The exemplary media imaging system 16 includes one or more media imaging device 18 and a server 20. Computer network 10 may be implemented in a private network arrangement (such as an intranet), public network arrangement (such as the internet), a combination of private and public networks, or other configurations capable of communicating digital information.

In one embodiment, host devices 12 are configured to issue requests for the production of hard images (or otherwise initiate imaging operations) using one or more of media imaging devices 18. Exemplary host devices 12 include personal computers, work stations, servers, or any other device able to initiate imaging operations. Host devices 12 may include appropriate programming including one or more application programs and/or drivers to initiate or assist with media imaging functions.

Communications link 14 is arranged to implement communications between respective devices 12-20. Communications link 14 may be implemented using a cable, wireless, or remote connection via a telecommunications link, an infrared link, a radio frequency link or any other connector or system that provides electronic communication between coupled components 12-20 of network 10. Communications link 14 may represent an intranet, the internet or a combination of both.

Media imaging devices 18 include printers, facsimile devices, copiers, multiple-function devices, or other devices capable of forming hard images upon media such as paper, labels, transparencies, roll media, etc. Hard images include images physically rendered upon physical media. In an embodiment wherein devices 18 include printers, image jobs may be referred to as print jobs.

Host devices 12 include any combination of hardware and/or programming capable of issuing a production request or otherwise capable of initiating hard imaging operations. Server 20 may be referred to as a production server. Server 20 represents any combination of hardware and/or programming capable of managing requests for imaging within network 10 for associated media imaging devices 18.

Figure 2:
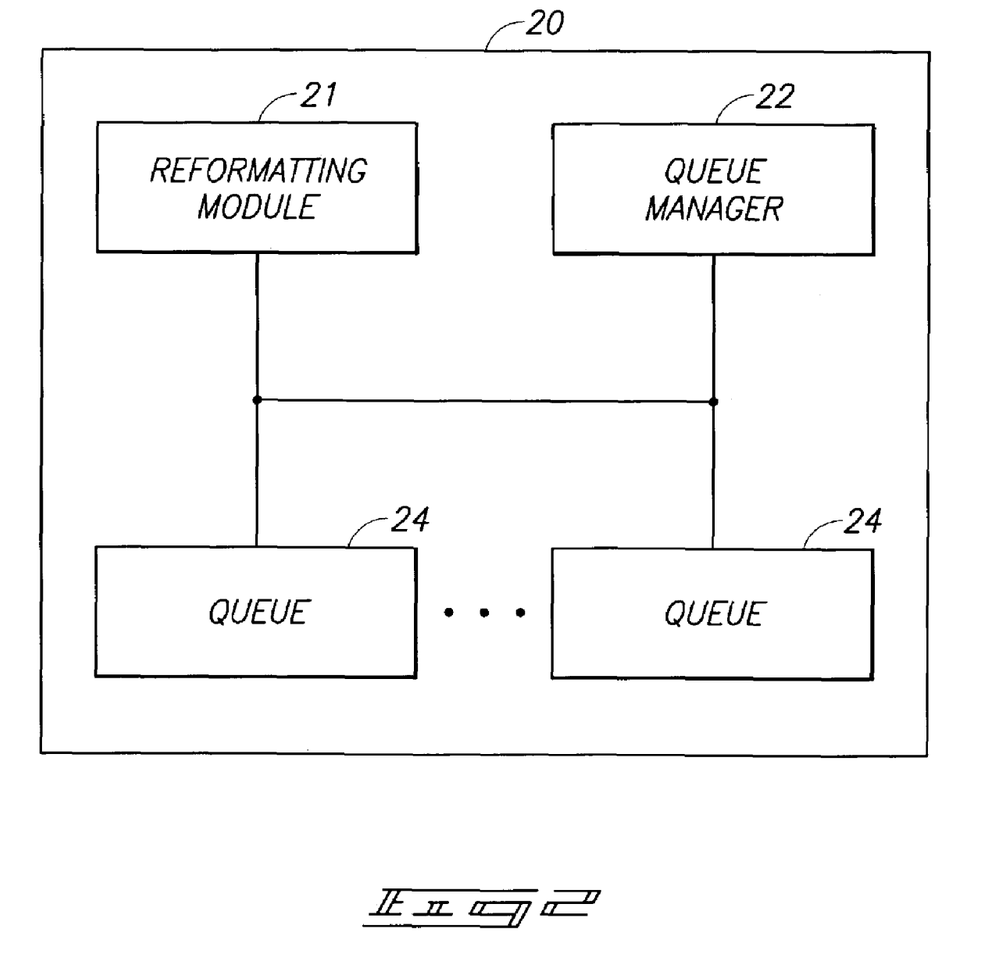
FIG. 2 is a functional block diagram of an exemplary server of FIG. 1 in accordance with one embodiment.

Referring to FIG. 2, an exemplary configuration of server 20 includes a reformatting module 21, a queue manager 22, and one or more queues 24. Reformatting module 21 and queue manager 22 generally represent programming of server 20. Reformatting module 21 may be arranged to cause server 20 to receive production requests formatted for a particular imaging media device 18 and to reformat requests for a different media imaging device 18 if imaging of the request is to be performed by one of devices 18 other than the device 18 intended when the request was created. For example, rerouting or redirection operations of image jobs are described in commonly assigned U.S. patent application entitled "Reformatting Dynamically Rerouted Production Requests," having Ser. No. 10/186,057 ('057), filed Jun. 27, 2002, naming Robert Sesek as inventor, and the teachings of which are incorporated herein by reference.

Queue manager 22 manages requests within queues 24. Queues 24 may be associated with respective media imaging devices 18. Queues 24 may be generally configured as electronic holding bins capable of containing requests directed to respective media imaging devices 18. In exemplary operations, queue manager 22 may intercept a request directed to a particular one of media imaging devices 18 and place the request in another appropriate queue 24 associated with the respective desired media imaging device 18 responsive to a redirection operation. Queue manager 22 releases requests from the respective queues 24 for communication to appropriate media imaging devices 18, as the media imaging devices 18 become available.

Figure 3:
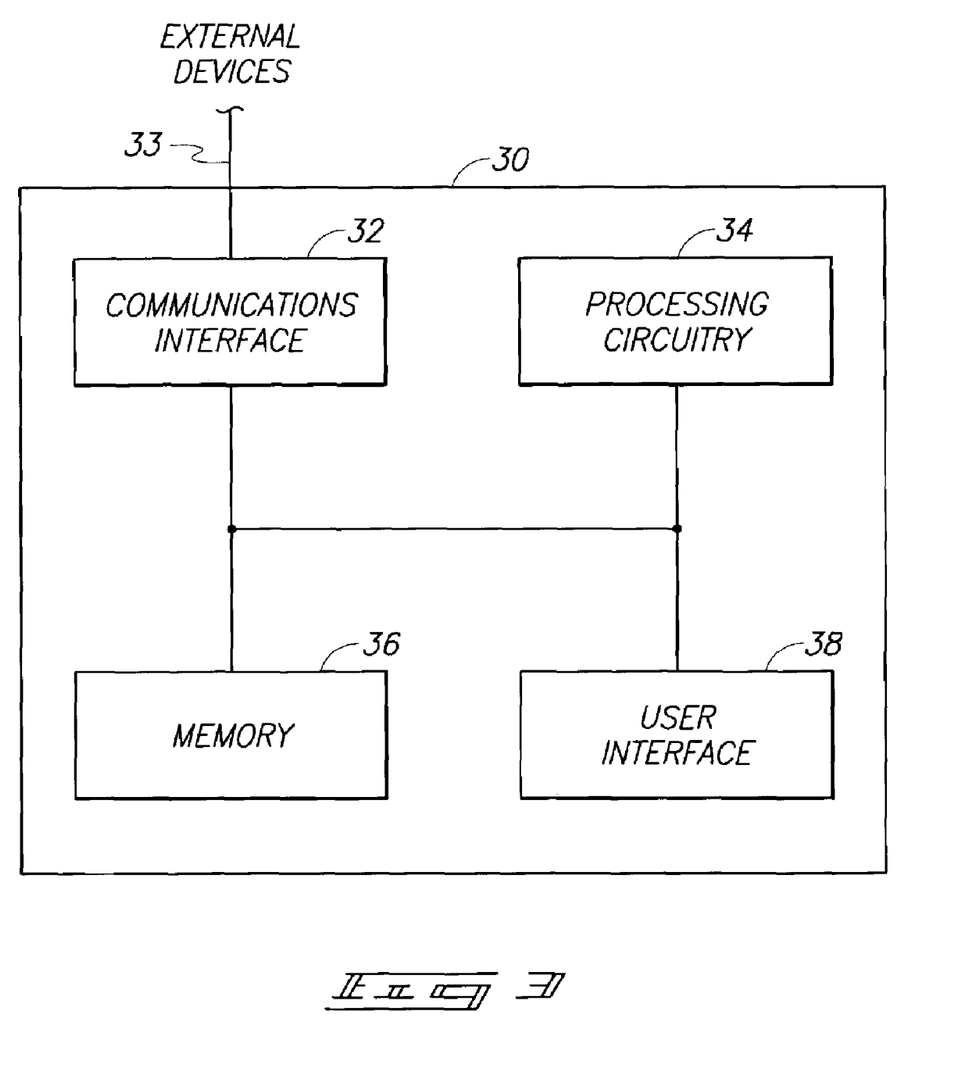
FIG. 3 is a functional block diagram of an exemplary media imaging monitoring system according to one embodiment.

Referring to FIG. 3, a media imaging monitoring system 30 is illustrated, according to one embodiment. The depicted exemplary monitoring system 30 includes a communications interface 32, processing circuitry 34, a memory 36, and a user interface 38. Some of the depicted components are optional and other arrangements of monitoring system 30 are possible. Exemplary operations of the depicted monitoring system 30 are described with reference to media imaging system 16 including a plurality of media imaging devices 18 arranged as printers. According to other embodiments or aspects, monitoring system 30 may be arranged to monitor operations of other configurations of media imaging systems 16.

Communications interface 32 is configured to couple with a medium 33 and to implement input/output communications between monitoring system 30 and external devices using medium 33. Medium 33 may include a private and/or public communications network, such as the internet, or other appropriate communications arrangement. In one embodiment, communications interface 32 is implemented as a network interface card (NIC).

Processing circuitry 34 may be implemented as a microprocessor arranged to execute programming, such as executable code, to control operations of monitoring system 30. For example, processing circuitry 34 may execute executable instructions stored within memory 36 and including software and/or firmware instructions. Processing circuitry 34 analyzes and/or simulates operations of media imaging system 16 in a variety of configurations, as described further below.

Memory 36 stores digital information and instructions. For example, memory 36 is configured to store executable code usable by processing circuitry 34, performance data regarding operations of media imaging system 16, image data used to form hard images, etc. Memory 36 includes one or more processor-usable medium configured to store executable instructions. Processor-usable media includes any configuration that can contain, store, or maintain programming for use by or in connection with an instruction execution system including processing circuitry 34 in the exemplary embodiment. For example, exemplary processor-usable media may include any one of physical media such as electronic, magnetic, optical, electromagnetic, infrared or semiconductor media. Some more specific examples of processor-usable media include, but are not limited to, a portable magnetic computer diskette such as a floppy diskette, zip disk, hard drive, random access memory, read only memory, flash memory, erasable programmable read only memory, compact disk, or other configurations capable of storing programming.

User interface 38 is arranged to receive user input and to depict information for communication to a user. In one embodiment, user interface 38 includes a keyboard and/or other input device as well as a display.

Monitoring system 30 may be implemented in a variety of different configurations. In one embodiment, monitoring system 30 is arranged to monitor operations of imaging system 16 arranged according to a first configuration wherein one or more of the imaging devices 18 are arranged to image jobs according to one or more criteria. Exemplary criteria for controlling which of the available media imaging devices 18 images a given job include imaging jobs originating from host devices 12 of a respective physical area or respective user or group of users, imaging jobs of a specified type (e.g., word processor, graphics, etc.), or according to other criteria used to route image jobs within system 16 to appropriate media imaging devices 18. Image jobs having common criteria may be referred to as being within a respective one of a plurality of classes of image jobs.

Over time, amount of usage of individual media imaging devices 18 may vary, needs of associated users may change, or other rationale may exist for analyzing a given configuration of media imaging system 16 in an effort to optimize operations of system 16 and utilization of resources including media imaging devices 18.

Accordingly, it may be desired to reevaluate the configuration of the imaging system 16. An initial configuration of imaging system 16 may be referred to as a first configuration. Changing the initial configuration of imaging system 16 (i.e., providing a second configuration of imaging system 16) may include changing the criteria associated with individual devices 18 for routing of jobs to one or more of devices 18 of the first configuration of imaging system 16 to provide one or more second configurations of imaging system 16. For example, the second configuration of system 16 may have devices 18 which were not present in the first configuration of system 16, or the first configuration may include one or more media imaging devices 18 which are not present in the second configuration. Criteria associated with image jobs to control routing of jobs by server 20 may be different to control the routing of jobs to the respective devices 18. In one embodiment, the different configurations of system 16 may include common media imaging devices 18 with different respective criteria in the respective configurations to control the routing of image jobs to media imaging devices 18 in the different configurations. Further reconfiguration operations are described below.

Some embodiments of the invention enable a system administrator or other users to evaluate and facilitate potential reconfigurations of media imaging system 16. In one embodiment, image data including data of a plurality of image jobs usable by media imaging devices 18 of the first configuration of system 16 to generate hard images may be collected. Image data can include, but is not limited to, application data, rasterized data, bit map data, or data in any other form configured to cause media imaging devices 18 to physically render hard images upon media. Image data may originate from one or more host device 12 executing an application, such as a word processor, spreadsheet program, internet browser, etc., or from another appropriate source.

The image data may be captured or otherwise collected during imaging operations of imaging devices 18 of the first configuration of media imaging system 16. In one embodiment, the collected image data may be thereafter utilized to analyze operations of imaging system 16 having other different configurations to determine an appropriate reconfiguration scheme of system 16, if any. The usage of the collected image data provides a baseline for subsequent analysis of imaging systems 16 having different possible configurations. Accordingly, the image data may be referred to as control image data in at least one embodiment.

In one embodiment, server 20 is arranged to compile and internally store the image data of a plurality of image jobs imaged by system 16. In but one possible implementation, server 20 may copy image data into memory (not shown), upon an internal hard disk, or other separate storage location following receipt of the image jobs, and at the time the image jobs are placed into queues 24 (and subsequently imaged using respective media imaging devices 18) to compile the image data during the operations of system 16 according to the first configuration.

In one embodiment, media imaging devices 18 communicate image data to server 20 for compilation (e.g., image data flows directly to media imaging devices 18 from one or more host 12 and media imaging devices 18 subsequently communicate image data to server 20). The above data capture is exemplary and other configurations or methods for storage or obtaining image data are possible.

Monitoring system 30 may subsequently receive the captured image data for utilization in analyzing different configurations of imaging system 16. Communications interface 32 of monitoring system 30 is configured to receive the image data from server 20 in one embodiment.

In one embodiment, server 20 is also arranged to generate performance data regarding imaging operations of media imaging devices 18 of a given configuration. Other devices or methods for providing performance data are possible. Performance data includes any data useful for gauging performance during imaging operations of a configuration of system 16 at the device level and/or system level. For example, performance data may include separate segregated data regarding respective imaging operations of one or more individual media imaging devices 18 of a given configuration of system 16 and/or composite data regarding operations of all media imaging devices 18 of the configuration of system 16. Exemplary performance data is discussed in commonly assigned co-pending U.S. patent application Ser. No. 10/260,827 ('827), filed Sep. 27, 2002, entitled "Image Forming Devices, Imaging Methods, And Methods Of Modifying A Configuration Of An Image Forming Device," and listing Travis Parry and Robert Sesek as inventors, the teachings of which are incorporated herein by reference. As discussed in the '827 application, exemplary performance data includes number of pages imaged at moments in time, number of jobs imaged at moments in time, and job size information.

Additional or alternate performance data may be generated or utilized including data regarding amounts of time utilized to image image jobs. For example, media imaging devices 18 may monitor the amount of time utilized to electrically process and physically generate jobs and forward the timed information to server 30. Formatter processing speeds (rasterization or other electrical manipulation of data), mechanical engine speeds and other quantifiable criteria regarding imaging operations of the media imaging devices 18 may be stored within server 20, and accessed to calculate timing or amount of time information to process jobs responsive to job size information extracted by jobs in queues 24, for example, in simulation operations described below. Performance data obtained using a first configuration of imaging system 16 may be referred to as initial performance data and exemplary subsequent performance data corresponds to second configurations of system 16.

At an appropriate subsequent moment in time (e.g., following capturing of all relevant image data and performance data during operations of system 16 according to an initial configuration), the configuration of system 16 may be altered to provide one or more second configurations enabling analysis of additional possible configurations of imaging system 16. In one embodiment, the second configuration may be referred to as a virtual configuration for analyzing different possible configurations of system 16 and operations of the second configuration may be simulated using the captured image data, as described below.

For example, electrical representations of configurations of system 16 may be developed, provided, or otherwise accessed by system 30. The representations of system 16 may identify individual media imaging devices 18 including respective operating parameters including electrical processing speeds, mechanical engine speeds and/or other desired parameters indicative of performance of the respective individual media imaging devices 18. A system administrator or user may input the information regarding the first configuration of system 16 into system 30 using user interface 38, or an electronic file including such information. Parameters may be pulled from external resources, such as a website of a manufacturer of an individual media imaging device 18 or from another source, to provide operation characteristics or information regarding imaging performance of media imaging devices 18. The electrical representation of the first configuration of system 16 may additionally include the criteria which controls the routing of media imaging image jobs to appropriate devices 18.

As mentioned above, one or more second configurations of media imaging system 16 may be provided. A system administrator or user may reconfigure the representation of the system 16 using user interface 38 to provide the second configuration. In other aspects, processing circuitry 34 of monitoring system 30 is arranged to suggest reconfigurations of media imaging system 16 for analysis. For example, processing circuitry 34 of monitoring system 30 may reconfigure the representation of imaging system 16 in a plurality of possible initial arrangements (e.g., reassign image jobs from one or more host device 12 to different media imaging devices 18), obtain performance data for respective individual ones of the arrangements by simulating imaging operations, compare the obtained performance data with performance data of the first configuration of the imaging system 16, and select or make suggestions for a user for configurations offering improved performance with respect to the first configuration responsive to the comparison.

In one embodiment, providing a second configuration of the image forming system 16 includes reassigning at least one image job from one of media imaging devices 18 of the first configuration to correspond to another of the media imaging devices 18 of the second configuration. The reassigning can include identifying image jobs as a predefined type or within a class of imaging jobs and directing the jobs of the predefined type or class to different media imaging devices 18 for processing compared with the first configuration. For example, such reassignings may direct image jobs from a given host 12 to a different media imaging device 18 or provide direction of a specific type of image job to different respective media imaging device 18. Other criteria may be utilized to reconfigure the representation of the image forming system 16.

In one embodiment, a second configuration may include adding or deleting one or more media imaging device 18 to system 16 after obtaining the performance data according to the first configuration of imaging system 16. For example, in one embodiment, a first configuration of imaging system 16 may utilize a common imaging device 18 to image a first type or class of imaging job in a first configuration and arrange a second configuration of the imaging system 16 to utilize the common imaging device 18 to image a second type or class of imaging job different than the first type of imaging job in the second configuration. In one embodiment, the first configuration of imaging system 16 utilizes the common imaging device 18 to image a job from a given host device 12 in the first configuration and arranges the second configuration to not utilize the common imaging device 18 to image a job from the common host device 12 in the second configuration. In one embodiment, a common imaging device 18 is utilized to process a first class of image jobs in the first configuration and the same common imaging device 18 is utilized to process a second class of image jobs different than the first class of image jobs in the second configuration. Electrical representations of the second configurations of a system 16 may be provided for subsequent analysis.

First and second configurations may refer to different configurations of imaging system 16. For example, in one embodiment, first configuration may refer to a configuration of imaging system 16 wherein image data is collected at an initial point in time prior to a reconfiguration of system 16, and second configuration may refer to a configuration of imaging system 16 after the system has been reconfigured and after the collection of the image data during the initial point in time.

Using image data, performance data and electrical representations of configurations of systems 16, a system administrator or other user can analyze operations of different possible configurations of the media imaging system 16 (i.e., second configurations) using simulation operations. Monitoring system 30 is arranged to simulate imaging operations of media imaging devices 18 of system 16 having the second configurations with respect to imaging of hard images upon media using the image data obtained during the first configuration of system 16. In addition, monitoring system 30 is arranged to generate performance data of individual ones of the second configurations of imaging system 16 which may be referred to as subsequent performance data.

In one embodiment, the subsequent performance data corresponding to the second configuration of imaging system 16 is obtained using the captured image data. In one embodiment, processing circuitry 34 may simulate imaging of the captured image data using one or more different second configuration of system 16. Subsequent performance data may be obtained for the respective second configurations of imaging system 16 responsive to the simulations. Accordingly, in embodiments wherein simulation of operations of imaging system 16 are performed, subsequent performance data may be obtained without generating hard images.

Figure 4:
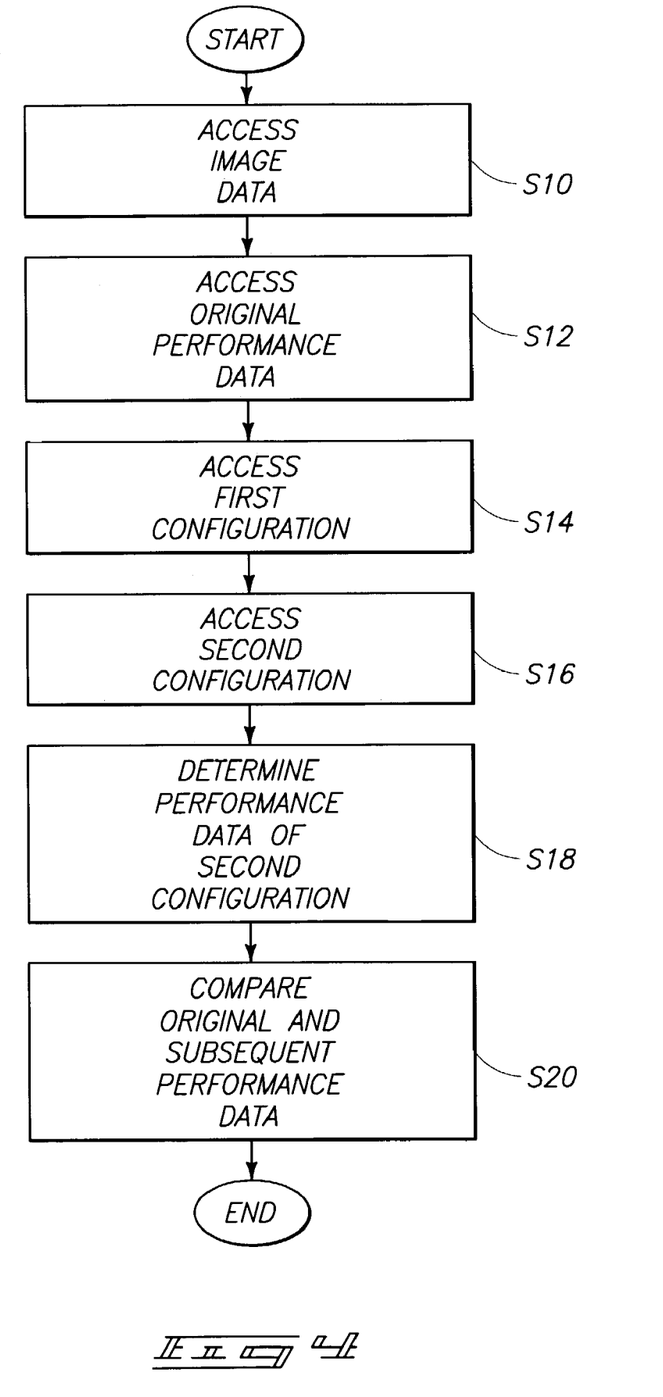
FIG. 4 is a flow chart depicting exemplary operations of the media imaging monitoring system according to one embodiment.

Referring to FIG. 4, exemplary operations of processing circuitry 34 with respect to simulations of configurations of imaging system 16 are described. The depicted methodology may be implemented by processing circuitry 34 using code stored within memory 36 in one embodiment. The methodologies are presented to illustrate exemplary steps for performing aspects of the invention. Other methods are possible including more, less or alternative steps.

At a step S10, the processing circuitry operates to access original image data corresponding to a first configuration of a media imaging system. In one embodiment, the image data may be accessed from memory 36, user interface 38, server 20 or other appropriate source.

At a step S12, the processing circuitry operates to access original performance data corresponding to the original image data and the first configuration of the media imaging system. In one embodiment, the performance data may be accessed from memory 36, user interface 38, server 20 or other appropriate source.

At a step S14, the processing circuitry operates to access the electrical representation of the first configuration of the imaging system 16 which specifies which media image devices are arranged to image respective types or classes of image jobs.

At a step S16, the processing circuitry operates to access an electrical representation of a second configuration of the imaging system 16. In exemplary arrangements, the processing circuitry of the monitoring system analyzes the imaging system and provides the second configuration, or receives the second configuration from user commands input via user interface 38, from communications interface 32, from memory 36, or other appropriate source.

At a step S18, the processing circuitry performs simulation operations of the imaging system arranged according to the second configuration and using the original image data. Step S18 yields subsequent performance data corresponding to the second configuration of the imaging system.

At a step S20, the processing circuitry is arranged to compare the original performance data and subsequent performance data. The processing circuitry may additionally communicate the results to a user using, for example, communications interface 32 and/or user interface 38.

In other embodiments, the depicted methodology of FIG. 4 may be repeated following execution of step S20 to analyze the original image data with respect to different second configurations of imaging system 16. For example, the methodology may be repeated in one embodiment responsive to the comparison results of step S20 being unsatisfactory.

Aspects of at least one embodiment may be implemented using processor-usable or executable code stored within appropriate storage devices or communicated via a network or using other transmission media and configured to control appropriate processing circuitry. For example, processor-usable code may be provided via articles of manufacture, such as an appropriate processor-usable medium as described above, or alternately embodied within a data signal (e.g., carrier wave, data packets, etc.) communicated via appropriate media, such as a communication network (e.g., the Internet and/or a private network) or other communication structure.

In one embodiment, performance data is utilized to evaluate potential shifts in user activity for load balancing and throughput. A user may evaluate system configurations using image data obtained using a given configuration of a system to evaluate possible impacts upon performance from shifting or rearranging the configuration of the imaging system 16. Simulation and analysis may be facilitated for different configurations of the imaging system 16 having identical types of media imaging devices 18 or different types of media imaging devices 18. For second configurations of the imaging system 16 having or using different media imaging devices 18, simulations may be performed using data obtained from manufacturers or extrapolated using historical data of throughput for the new media imaging devices 18 to account for different processing speeds and mechanical engine speeds.

The exemplary comparison operations described herein enable suggestions to be made to a system administrator for shifting of various users, groups, job types to different or new media imaging devices 18 of system 16, or otherwise reconfiguring the system 16. In one embodiment, following the analysis within the monitoring system 30, a reconfiguration may be implemented in an actual imaging system 16 using server 20 operating according to aspects of the '057 U.S. patent application, described above.

In one embodiment, advantages are provided inasmuch as service is not disrupted to end users to determine how a reconfiguration of the imaging system 16 will turn out. A reconfiguration of the imaging system 16 may be simulated and analyzed prior to changes and users can be informed of a reconfiguration of imaging system 16 and the appropriate media imaging devices 18 may be identified for processing of jobs for the respective users. Another advantage of at least one embodiment includes not automatically rerouting jobs dynamically (i.e., with the associated problems of users not knowing where their image job has been generated or otherwise processed). Aspects described herein enable and facilitate simulation of different media imaging system reconfigurations and comparison of operations of the systems.

The protection sought is not to be limited to the disclosed embodiments, which are given by way of example only, but instead is to be limited only by the scope of the appended claims.

What is claimed is:

1. A method of monitoring a media imaging system, the method comprising:
providing image data comprising a plurality of image jobs configured to cause a plurality of media imaging devices of the media imaging system to generate a plurality of hard images upon media, wherein the image jobs correspond to respective ones of the media imaging devices;
reassigning at least one of the image jobs from one of the media imaging devices to correspond to another of the media imaging devices; and
obtaining performance data regarding imaging operations of the media imaging devices with respect to imaging of hard images upon media according to the image data after the reassigning.

2. The method of claim 1 wherein the reassigning comprises identifying the at least one image job as originating from a predefined host device and the reassigning is responsive to the identifying.

3. The method of claim 1 wherein the reassigning comprises identifying the at least one image job as a predefined type of imaging job and the reassigning is responsive to the identifying.

4. The method of claim 1 wherein the providing the image data comprises capturing image data used in the media imaging system to generate hard images prior to the reassigning.

5. The method of claim 4 wherein the capturing comprises capturing the image data using a printer server.

6. The method of claim 4 wherein the capturing comprises receiving the image data from the media imaging devices.

7. The method of claim 1 wherein the media imaging devices comprise printers and the image jobs comprise print jobs.

8. The method of claim 1 wherein the reassigning comprises reassigning the at least one image job to the another media imaging device comprising a new media imaging device added to the media imaging system after the providing the image data.

9. The method of claim 1 wherein the obtaining performance data comprises simulating the imaging operations of the media imaging devices using the image data.

10. The method of claim 1 wherein the obtaining performance data comprises obtaining without generating hard images.

11. The method of claim 1 further comprising providing initial performance data regarding imaging operations of the media imaging devices with respect to the generation of the hard images according to the image data prior to the reassigning.

12. The method of claim 11 wherein the obtaining comprises obtaining subsequent performance data, and further comprising comparing the initial performance data with the subsequent performance data.

13. A media imaging monitoring system comprising:
a communications interface configured to access image data configured to cause a plurality of media imaging devices of a media imaging system having a first configuration to generate a plurality of hard images upon media; and
processing circuitry configured to access the image data and to simulate imaging operations of a plurality of media imaging devices of the media imaging system having a second configuration different than the first configuration with respect to imaging of hard images upon media according to the image data.

14. The system of claim 13 wherein the processing circuitry is configured to create the media imaging system having the second configuration from the media imaging system having the first configuration.

15. The system of claim 13 wherein the media imaging systems of the first configuration and the second configuration comprise a common media imaging device and the first configuration utilizes the common media imaging device to image a first type of imaging job, and the processing circuitry is configured to arrange the second configuration to utilize the common media imaging device to image a second type of imaging job different than the first type of imaging job.

16. The system of claim 13 wherein the media imaging systems of the first configuration and the second configuration comprise a common media imaging device and the first configuration utilizes the common media imaging device to image an imaging job from a host and the processing circuitry is configured to arrange the second configuration to not utilize the common media imaging device to image an imaging job from the host.

17. The system of claim 13 wherein the media imaging systems of the first configuration and the second configuration comprise a common media imaging device and the common media imaging device is configured to process a first class of image jobs in the first configuration and the processing circuitry is configured to utilize the common media imaging device to process a second class of image jobs different than the first class of image jobs in the second configuration.

18. The system of claim 13 wherein the processing circuitry is configured to access initial performance data regarding imaging operations of the media imaging devices of the media imaging system having the first configuration, and to generate subsequent performance data responsive to the simulation of the imaging operations of the media imaging system having the second configuration, and to compare the subsequent performance data with the initial performance data.

19. A media imaging monitoring system comprising:
means for accessing image data configured to cause a plurality of media imaging devices arranged according to a first configuration of a media imaging system to form a plurality of hard images upon media;
means for accessing a second configuration of the media imaging system different than the first configuration and including at least some of the media imaging devices; and
means for simulating imaging operations of the at least some media imaging devices of the second configuration of the media imaging system with respect to imaging of hard images upon media according to the image data.

20. The system of claim 19 wherein the means for simulating comprises the means for accessing the second configuration of the media imaging system.

21. The system of claim 19 further comprising means for generating performance data regarding the simulating of the imaging operations.

22. The system of claim 21 further comprising means for accessing initial performance data regarding imaging operations of the media imaging devices of the first configuration of the media imaging system and for comparing the initial performance data with the generated performance data.

23. An article of manufacture comprising:
a processor-usable medium comprising processor-usable code configured to cause processing circuitry to:
access image data configured to cause a plurality of media imaging devices of a media imaging system having a first configuration to generate a plurality of hard images upon media;
access a media imaging system having a second configuration different than the first configuration; and
obtain performance data regarding imaging operations of the media imaging system having the second configuration with respect to the formation of hard images using the accessed image data.

24. The article of claim 23 wherein the first configuration and the second configuration include a common media imaging device, and the common media imaging device is configured to image a first class of image data in the first configuration, and the processor-usable medium comprises processor-usable code configured to cause processing circuitry to obtain the performance data regarding imaging operations of the common media imaging device with respect to a second class of image data different than the first class of image data.

25. The article of claim 23 wherein the accessed image data comprises a plurality of image jobs end the first configuration and the second configuration of the media imaging systems individually comprise a plurality of media imaging devices, and one of the media imaging devices of the first configuration is configured to process one of the image jobs, and wherein the processor-usable medium comprises processor-usable code configured to cause processing circuitry to use another of the media imaging devices of the second configuration to process the one image job.

26. The article of claim 23 wherein the processor-usable medium comprises processor-usable code configured to cause processing circuitry to simulate the imaging operations of the media imaging system having the second configuration to obtain the performance data.

27. The article of claim 23 wherein the processor-usable medium comprises processor-usable code configured to cause processing circuitry to obtain the performance data without generation of hard images.

28. The article of claim 23 wherein the processor-usable medium comprises processor-usable code configured to cause processing circuitry to eccess initial performance data regarding imaging operations of the media imaging system having the first configuration with respect to the accessed image data.

29. The article of claim 28 wherein the processor-usable medium comprises processor-usable code configured to cause processing circuitry to compare the obtained performance data and the initial performance data.

* * * * *

UNITED STATES PATENT AND TRADEMARK OFFICE
CERTIFICATE OF CORRECTION

| | |
|---|---|
| PATENT NO. | : 7,283,271 B2 |
| APPLICATION NO. | : 10/354632 |
| DATED | : October 16, 2007 |
| INVENTOR(S) | : Robert Sesek et al. |

Page 1 of 1

It is certified that error appears in the above-identified patent and that said Letters Patent is hereby corrected as shown below:

In column 12, line 37, in Claim 25, delete "end" and insert -- and --, therefor.

In column 12, line 58, in Claim 28, delete "eccess" and insert -- access --, therefor.

Signed and Sealed this

First Day of July, 2008

JON W. DUDAS
*Director of the United States Patent and Trademark Office*